(12) United States Patent
Acevedo

(10) Patent No.: US 10,946,287 B2
(45) Date of Patent: Mar. 16, 2021

(54) METHOD AND APPARATUS CONTROLLING A USER INTERFACE

(71) Applicant: KING.COM LIMITED, St. Julians (MT)

(72) Inventor: Johan Acevedo, Stockholm (SE)

(73) Assignee: KING.COM LTD., St. Julians (MT)

( * ) Notice: Subject to any disclaimer, the term of this patent is extended or adjusted under 35 U.S.C. 154(b) by 98 days.

(21) Appl. No.: 16/143,619

(22) Filed: Sep. 27, 2018

(65) Prior Publication Data

US 2020/0101386 A1   Apr. 2, 2020

(51) Int. Cl.
*A63F 13/80* (2014.01)
*A63F 13/61* (2014.01)
*A63F 13/2145* (2014.01)

(52) U.S. Cl.
CPC .......... *A63F 13/80* (2014.09); *A63F 13/2145* (2014.09); *A63F 13/61* (2014.09); *A63F 2250/1078* (2013.01); *A63F 2250/22* (2013.01); *A63F 2300/8094* (2013.01)

(58) Field of Classification Search
CPC ...... A63F 13/80; A63F 13/2145; A63F 13/61; A63F 2250/1078; A63F 2250/22; A63F 2300/8094
See application file for complete search history.

(56) References Cited

U.S. PATENT DOCUMENTS

| | | | |
|---|---|---|---|
| 5,349,587 A * | 9/1994 | Nadeau-Dostie | G01R 31/31855 714/729 |
| 5,511,212 A * | 4/1996 | Rockoff | G06F 1/04 712/22 |
| 6,231,445 B1 * | 5/2001 | Acres | G07F 17/32 463/16 |
| 2017/0229034 A1* | 8/2017 | Watanabe | G09B 7/06 |

* cited by examiner

*Primary Examiner* — Corbett B Coburn
(74) *Attorney, Agent, or Firm* — Saul Ewing Arnstein & Lehr LLP

(57) ABSTRACT

A computer device comprises a user interface configured to display time information associated with a feature. The time information indicates when the feature will change from one of being available and unavailable to the other of being available and unavailable. The time information changes at a first rate. At least one processor is configured, in response to a user interaction via the user interface, to cause the user interface to display content, the time information being configured to change at a second different rate while the content is displayed.

25 Claims, 10 Drawing Sheets

METHOD AND APPARATUS CONTROLLING A USER INTERFACE

FIELD OF THE INVENTION

Some embodiments relate to a method and apparatus for controlling a user interface. By way of example only, this may be in the context of a computer implemented game, a computer program or an app.

BACKGROUND OF THE INVENTION

Computer devices such as mobile phones, tablets, laptops and the like are provided with user interfaces.

Computer implemented applications are known and are often run on devices such as smart phones. Such devices often have a relatively small display area. One technical challenge with such applications is how to provide technical complexity whilst at the same time providing a varied experience for the user. Another technical challenge relates to how to keep users interested whilst using limited resources of a device on which the application is being run.

The limited resource may be a limited display resource. A limited display resource provides challenges such as how a user can interact with a particular part of the display. Another challenge relates to how to provide complexity which is able to be rendered in a visual distinct manner on the relatively small display.

Another significant challenge is that of user engagement. Engagement involves designing applications to be engaging and/or rewarding to users. Effective engagement may requires various forms of feedback. Often this needs to be provided in the context of an environment where only a limited number of resources of a computing device can be used in running the computer implemented application.

By way of example only, an application may provide a computer implemented game. One technical challenge with such games is how to provide technical complexity of a game whilst at the same time providing a varied gaming experience for the user. Another technical challenge relates to how to keep players interested whilst using limited resources of a device on which a game is being played.

One technical challenge can involve allowing a game to be fun and compelling even when there is limited display resource. A limited display resource provides challenges such as how a user can interact with a particular part of the display. Another challenge relates to how to provide complexity which is able to be rendered in a visual distinct manner on the relatively small display.

Another significant challenge is that of user engagement. Engagement involves designing gameplay and devices to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment. Often this needs to be provided in the context of an environment where only a limited number of resources of a computing device can be used in running the computer implemented game.

Another technical challenge relating to user engagement relates to the situation where for example an application feature is made unavailable for a given period of time to increase the anticipation of that feature. In this situation, it is a technical challenge to ensure that there is nevertheless still user engagement, despite the unavailability of that feature. Where the application is a computer implemented game, the feature may be a game feature.

Another technical challenge relating to user engagement relates to the situation where content is provided to a user, for example advertisement content. In this situation, it is a technical challenge to ensure that there is user engagement with that provided content. It is alternatively or additionally a technical challenge to make the display of content such as advertisement content appear to the user to be an integral part of an application experience.

This patent specification describes not only various ideas and functions, but also their creative expression. A portion of the disclosure of this patent document therefore contains material to which a claim for copyright is made and notice is hereby given: Copyright King.com Limited 2018 (pursuant to 17 U.S.C. 401). A claim to copyright protection is made to all screen shots, icons, look and feel and all other protectable expression illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device comprising: a user interface configured to display time information associated with a feature, the time information indicating when the feature will change from one of being available and unavailable to the other of being available and unavailable, the time information changing at a first rate; and at least one processor, the at least one processor being configured, in response to a user interaction via the user interface, to cause the user interface to display content, the time information being configured to change at a second different rate while the content is displayed.

The at least one processor may be configured to change the first rate to the second rate in response to the user interaction with the user interface causing the user interface to display the content.

The at least one processor may be configured to determined when the content is paused or no longer displayed and in response thereto change the rate at which the time information is updated to a third rate.

The third rate may be at the same as the first rate.

The content may comprise advertising content.

The feature may comprise a computer implemented game feature.

One of the first rate and the second rate may comprise a real time rate.

The first rate may be less than the second rate.

The at least one processor may be configured to provide one of a plurality of second rates in dependence on user interaction with respect to the user interface.

The user interaction may comprise a plurality of taps.

A rate of the plurality of taps may be configured to control a value of the second rate.

The at least one processor may be configured to control the user interface to display an interaction area, the user interaction being with respect to the user interaction area.

The time information may indicate an amount of time until a game feature is the other of being available and unavailable.

According to another aspect, there is provided a computer implemented method for controlling a user interface of a computer device, the device comprising the user interface and at least one processor, the method comprising: causing the user interface to display time information associated with a feature, the time information indicating when the feature will change from one of being available and unavailable to the other of being available and unavailable, the time information changing at a first rate; and causing by the at least one processor, in response to a user interaction via the user interface, the user interface to display content, the time information being configured to change at a second different rate while the content is displayed.

The method may comprise changing by at least one processor the first rate to the second rate in response to the user interaction with the user interface causing the user interface to display the content.

The method may comprise determining by the at least one processor when the content is paused or no longer displayed and in response thereto changing the rate at which the time information is updated to a third rate.

The third rate may be the same as the first rate.

The content may comprise advertising content.

The feature may comprise a computer implemented game feature.

One of the first rate and the second rate may comprise a real time rate.

The first rate may be less than the second rate.

The method may comprise providing by the at least one processor one of a plurality of second rates in dependence on user interaction with respect to the user interface.

The user interaction may comprise a plurality of taps.

A rate of the plurality of taps may control a value of the second rate.

According to an aspect, there is provided a computer readable non-transitory storage medium carrying one or more computer executable instructions which when run on at least one processor cause: a user interface of a computer device, to display time information associated with a feature, the time information indicating when the feature will change from one of being available and unavailable to the other of being available and unavailable, the time information changing at a first rate; and in response to a user interaction via the user interface, the user interface to display content, the time information being configured to change at a second different rate while the content is displayed.

According to some aspects, there is provided a program product comprising a computer-readable storage device including a computer-readable program, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described by way of example only with reference to the accompanying drawings in which.

DETAILED DESCRIPTION OF PREFERRED EMBODIMENTS

A person skilled in the art will realise that the different approaches to implementing the invention are not exhaustive, what is described herein are certain example embodiments. The illustrated example embodiments provide an improved user interface in the context of a computer implemented game. However, as will be described later, embodiments may be provided in non-computer game scenarios.

Figure 1:
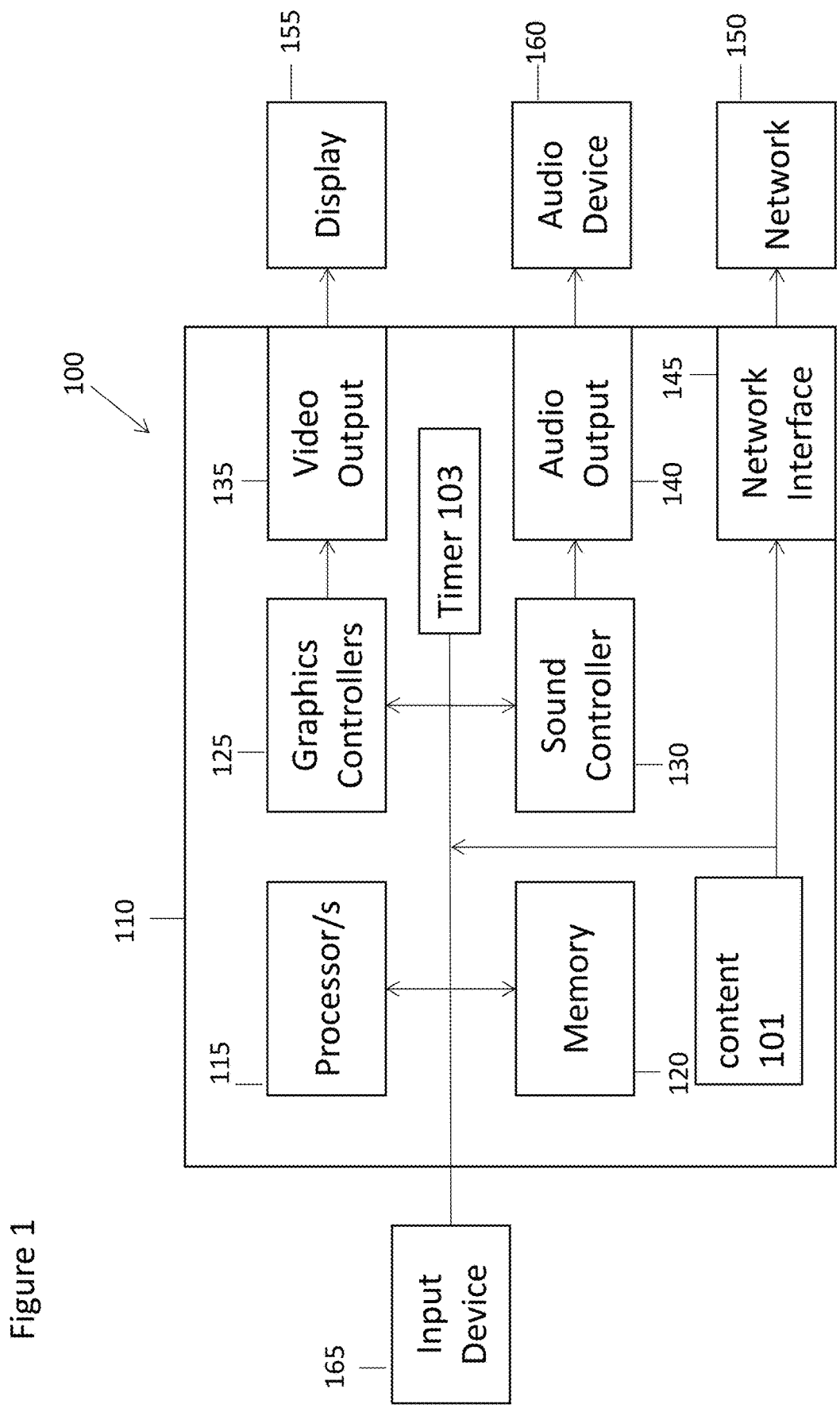
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110 with one or more processors 115. The control part 110 is shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The device comprises a content provider 101 which is configured to provide content which are displayed on the user device. The content provider may receive content from one or more servers. The content provider may comprise a client and/or a download content module DCM.

In some embodiments, the content provider may be configured to provide the content in the context of a computer implemented game. This will be described in more detail later. In other embodiments, the content may be provided in contexts other than computer implemented games. Some examples of this will be described in more detail later.

In some embodiments, at least some of the content may be advertisement content. The content provider may be an advertisement content provider. It should be appreciated, that alternatively or additionally the content may not be non-advertising content. Some examples of non-advertising content will be described later.

The advertisement and/or other content may be provided from one or more content servers and/or one or more servers providing the context in which the content is to be provided. For example, in the context of a computer implemented game, the content may alternatively or additionally be provided by a game server. The content server may for example be an advertising content server.

In some embodiments, at least some of the content may be game related content and/or content provided by the game provider. This will be referred to as "game content" and some examples of such content are discussed later. At least a part of this content may be provided by the game server. In this scenario, there may or may not be a dedicated content provider for this type of content. Where there is no dedicated content provider, the content may be provided to the user device by the game server as part of the game data and provided in the game by the at least one processor in conjunction with the at least one memory.

In some embodiments, more than one type of content may be provided. In these embodiments, there may be a common content provider or dedicated content providers. In some embodiments, there may be an advertisement content provider and game content which is provided by the game server as part of the game data.

The device comprises a timer or clock function 103. This may be a count up timer and/or a countdown timer. The timer may be a hardware timer, a software timer or a combination of a hardware and a software timer. The timer may be a separate timer and/or be implemented by the at least one processor in association with appropriate program code.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
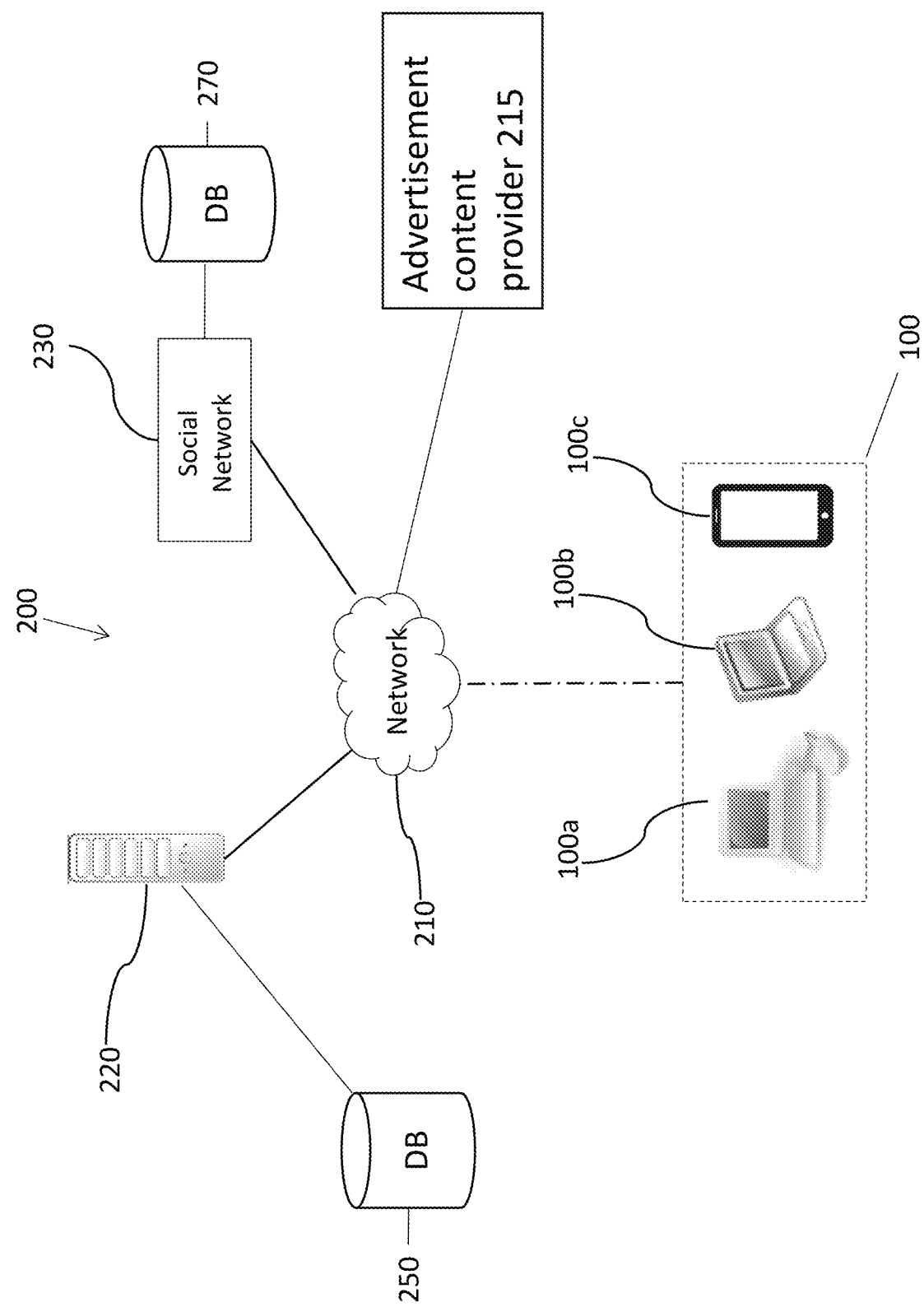
FIG. 2 shows an example system in which some embodiments may be provided.

FIG. 2 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 or other network to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

In those embodiments where game content is provided, this may be provided by server 220.

In some embodiments, one or more advertisement content provider 215 is provided. The advertisement content provider may comprise one or more of a content delivery network or an advertisement server. The advertisement content may be one or more of an in game promotion IGP, in app promotion IAP or cross promotion, and video advertisements. It should be appreciated that alternatively or additionally the advertisements may take any other suitable form. The advertising content may be provided by one or more external sources and/or be provided by provider of the computer implemented game being provided.

In this example, there is an advertisement content provider. This may alternatively or additionally be one or other content provider.

In some embodiments, the content may be provided by games server and the advertisement content provider may be omitted.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. One type of match-three game is a so-called "switcher" game. In a switcher game, the player switches place of two adjacent game elements on the game board so that one or both of them create a chain of at least three adjacent game elements of the same type. In particular, the user will interact with the user interface to select one of the game elements to be moved and then will drag via the user interface the selected game element to an adjacent position. Those matched game elements will then disappear. The game board is then repopulated with game objects.

One such known match three-type game is known by the trade name Candy Crush Saga™. In that game, the game board is repopulated with game elements which are perceived as falling downwards onto the game board from the top edge of the screen from which the game is played.

Figure 3:
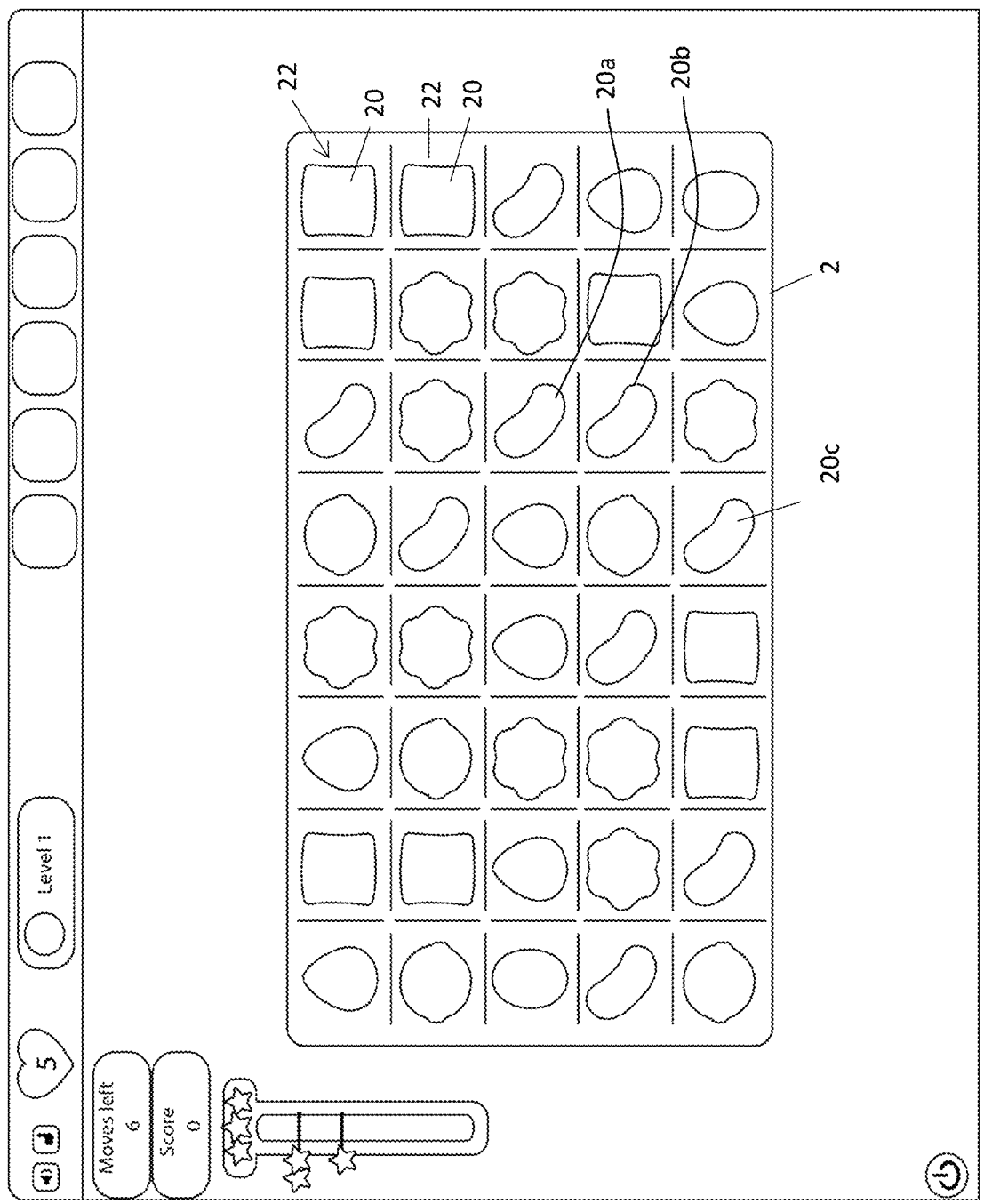
FIG. 3 is a schematic diagram of a game board of a match three game illustrating a basic example of a match three game.

By way of example only, FIG. 3 shows a display of a match 3 switcher game called Candy Crush Saga™. FIG. 3 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 4:
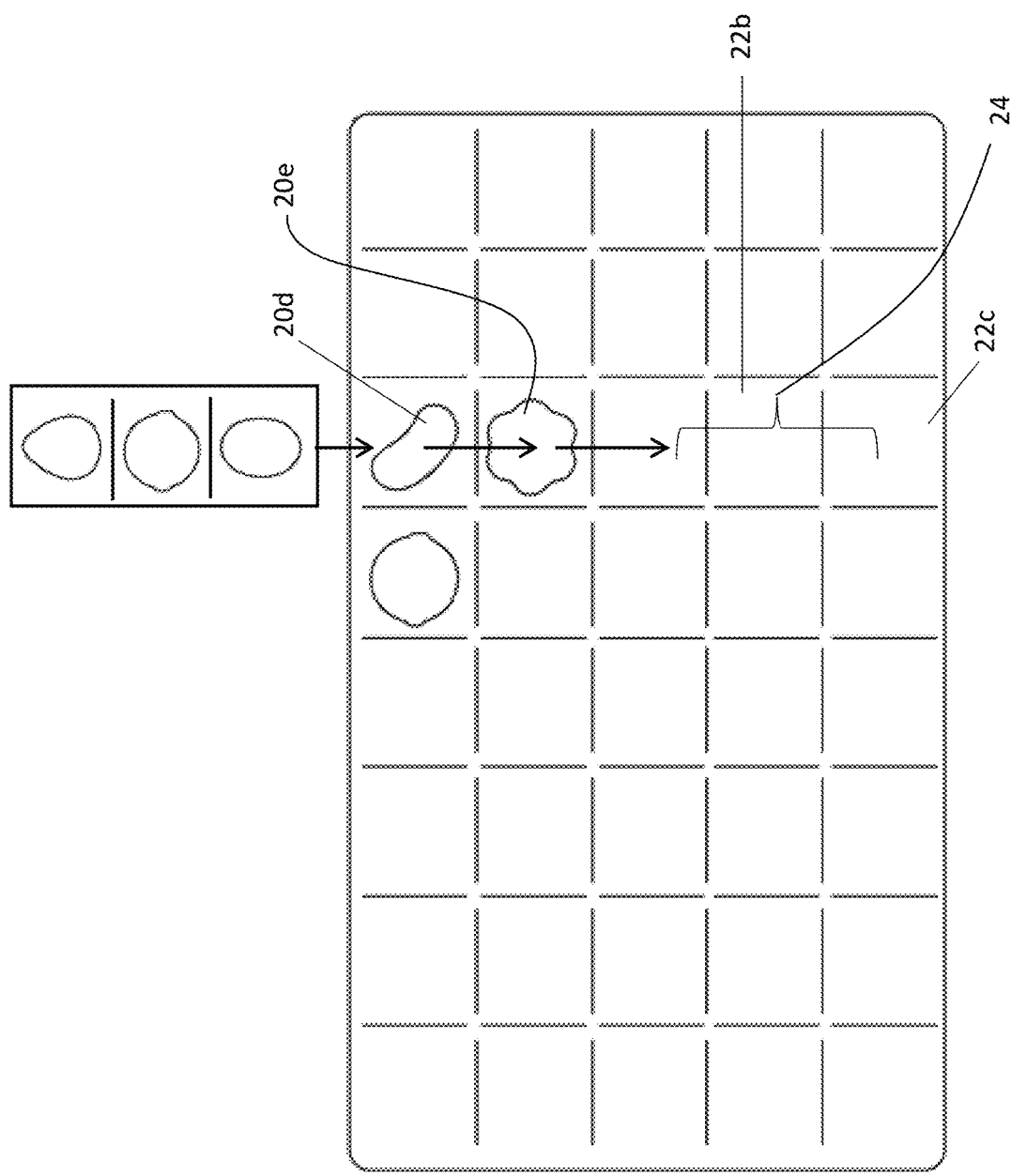
FIG. 4 is a schematic diagram illustrating how a game board is populated with replacement game elements.

In this match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 3 that game element 20c is moved one place to the right to form a three-line match with game elements 20a and 20b. Turning now to FIG. 4, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

Another known type of game is "linker game", where a sequence of game elements are linked to form a known sequence. In this example, the user interacts via the user interface to select a first game item. Where the user interface is a touch screen, the user will then drag their finger through each of the game elements in turn to thereby select the sequence of game elements. Another type of game is a 'clicker' game, in which matches can be made in a board by clicking, via the user interface, a group of adjacent game elements.

It should be appreciated that embodiments may be used with any other computer implemented game of any suitable genre. It should be appreciated that some embodiments may be provided in the context of other applications which are not provided a computer implemented game, as will be discussed later.

When playing computer implemented games, there may be one or more game features which are unavailable for one reason or another for a defined period of time.

In the following an example will be described with reference to a particular example of such a game feature. It should be appreciated that this is for illustrative purposes only and other embodiments may be used with any other game feature which is set to be unavailable for a defined period of time. Some embodiments may be used alternatively or additionally with game features which are set to be available for a defined period of time.

Figure 5:
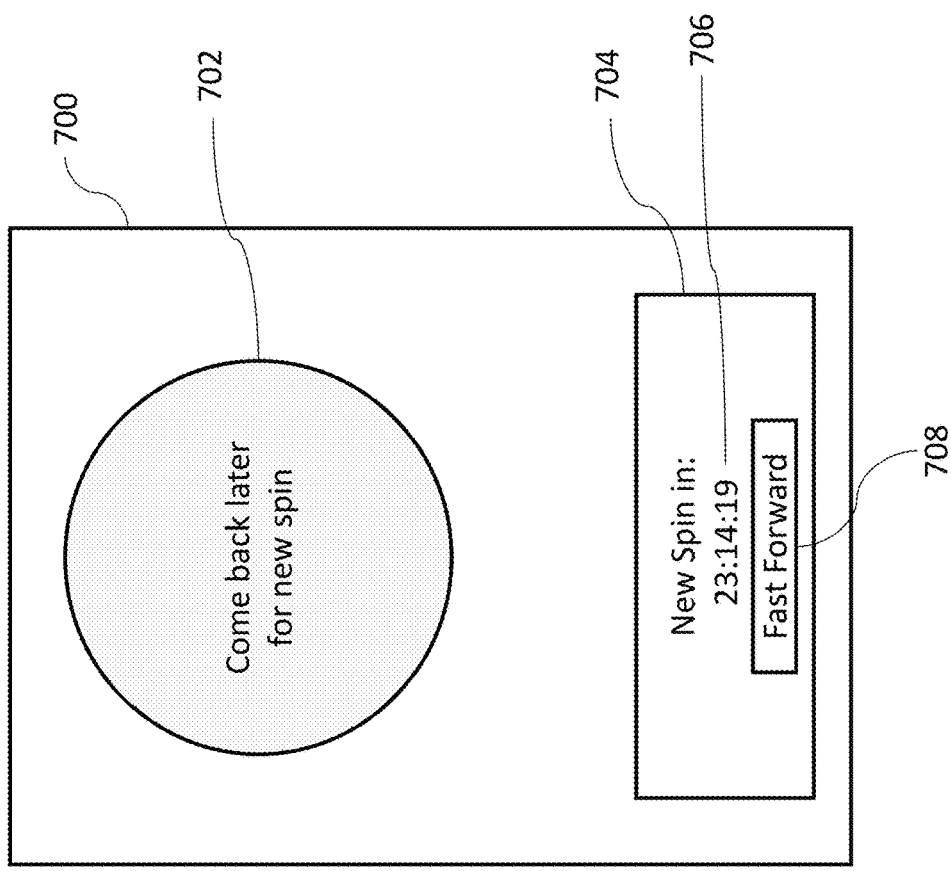
FIG. 5 schematically shows an user interface when a game feature is unavailable for a period of time in some embodiments.

Reference is made to FIG. 5 which schematically shows an image 700 which is displayed when the game feature is unavailable for a given time. The example game feature, which is provided in games such as Candy Crush™ is a wheel. The user is given a given number of times to spin the wheel where the given number of times is one or more. Depending on where the wheel stops, this determines what game booster or game reward is given to the user for use in playing the game.

Once the user has exhausted this game feature, e.g. by spinning the wheel the given number of times, the user is prevented from using this game feature for a given period of time. The length of time may be any suitable length of time and may be dependent on the game being played and/or the game feature itself. By way of example only, it is assumed in the following that the length of time is 24 hours.

The schematic image 700 shown in FIG. 5 show the game feature of wheel 702. In some embodiments, the unavailability of the feature is conveyed to the player of the game. This unavailability may be conveyed by fan image displayed on the display. In some embodiments, the wheel is displayed in one way when the user is able to spin the wheel and in a different way when the user is not able to spin the wheel. In some embodiments, the wheel is greyed out when that wheel cannot be spun and/or displayed with a message indicating that the wheel is unavailable. In some embodiments, when the feature is unavailable an image of the feature may be omitted.

In the example shown in FIG. 5, the message is "Come back later for a new spin". It should be appreciated that the message is optional. The message may alternatively be any suitable message.

In some embodiments, the image which is displayed may have an area 704 in which the amount of time 706 until the wheel is next available is shown. In this example, there are 23 hours, 14 minutes and 19 seconds until the wheel is next available. This time which is shown will update on a substantially real time basis to reflect the amount of time that remains.

It should be appreciated that amount of time until the game feature is available can be displayed in any suitable manner. This may be displayed as one or more of time elapsed or time remaining or time to availability of feature. This may be displayed numerically and/or by a graphical representation. For example a status bar which visually represents the amount of time until the game feature is available may be provided or an egg-timer type graphic.

In some embodiments, the aim may be reduce the length of time until the user is able to use a game feature again. However, it should be appreciated that in other embodiments, it may be desirable to increase the amount of time until a game feature is provided.

In some embodiments, the user is provided with an option which allows the rate at which the clock updates to be changed. This can be to increase or decrease the rate at which the clock is updated.

In some embodiments, the game feature is unavailable for a period of time and the user may be provided with an option which may increase and/or decrease the rate at which the clock is changed. This will alter the period of time until the feature is available.

In other embodiments, the game feature is available for a period of time and the user may be provided with an option which may increase and/or decrease the rate at which the clock is changed. This will alter the period of time until the feature is no longer available.

In some embodiments a clock may be used. However, it should be appreciated that in some embodiments, a timer may be used.

In any of the above described scenarios, the period of time may be altered by increasing or decreasing the rate at which time passes. In other embodiments, the period of time itself may altered, either increased or decreased depending on the particular feature.

The arrangement shown in FIG. 5 has an area 708 which when selected by the user causes the rate at which the timer changes to be altered. In the example shown in FIG. 5, this area 708 has the words "fast forward". However, this is by way of example only and the area 708 which is to be selected by the user may be displayed in any other suitable way. In this example the area 708 is the area 704. In other embodiments, the area 708 may be provided elsewhere on the displayed area. By way of example only, the area 708 may be superimposed on area 702 or elsewhere on the display area.

Figure 6:
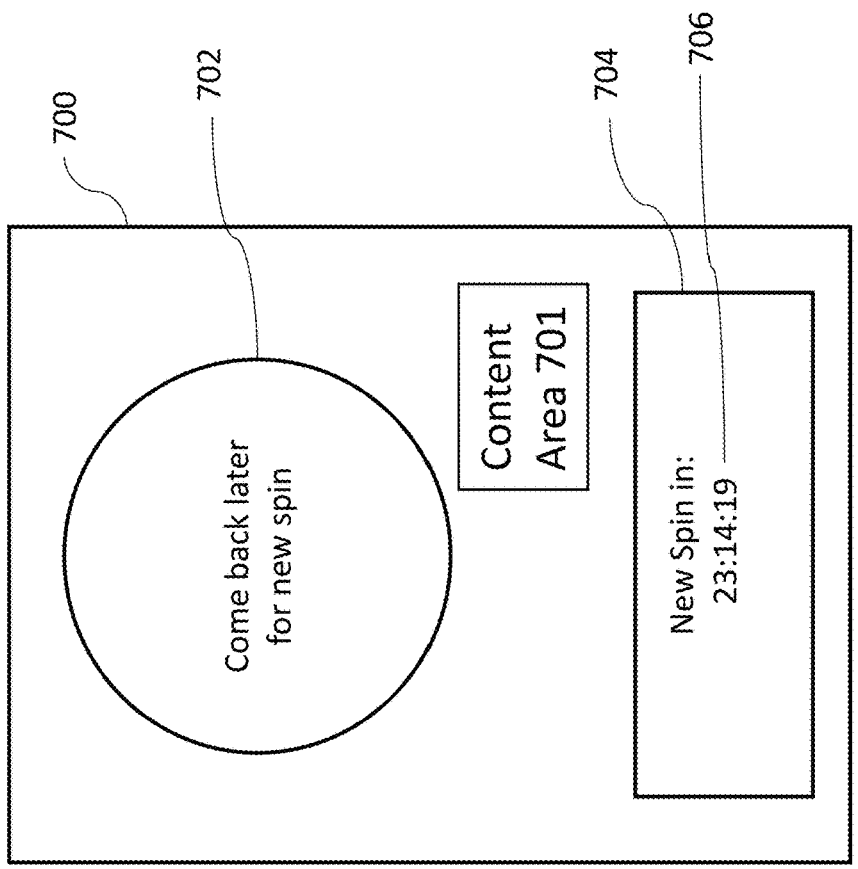
FIG. 6 schematically shows a user interface providing content of some embodiments.

When the user selects this area 708 by for example touching the touch screen, the user interface is modified to provide a content area 701 in which content is provided. This is shown in FIG. 6. The content area may be positioned at any suitable location on the displayed image. It may be displayed on a different part of the display to areas 704 and 702 such as shown in FIG. 6. In other embodiments, the content area may be displayed in area 704 or 702. It should be appreciated that in other embodiments, the position of the content area may be change.

In this embodiments, one content area is displayed. However it should be appreciated that in other embodiments, more than one content area may be provided.

In some embodiments, the user interface only provides this content area 701 after the fast forward option has been selected.

In some embodiments, the content area is provided by the user interface of FIG. 5 but only displays content when the user selects the fast forward option by selecting area 708.

The content may be any suitable content such as an advertisement or in game promotion content or any other suitable content. The content may be in the form of a video playing an advertisement, an image, an interactive area which encourages the user to interact with the content and/or the like. In some embodiments, where the user is able to click through to a website associated with the content, the website may be shown in a window provided in area 701 or any other suitable area.

In some embodiments, once the area 708 has been selected, this area 708 may be no longer displayed on the user interface. In some embodiments, the area 708 is only displayed when that area is selectable.

In some embodiments, the area 708 is displayed in different ways depending on whether it is currently selectable or not. The area may be for example greyed out when it is not selectable.

In some embodiments, when the modified rate at which the timer is updated will be provided only when the content is being provided. Once the content has been consumed, the rate at which the timer is updated reverts to a default rate. The default rate may be a real time rate.

Figure 7:
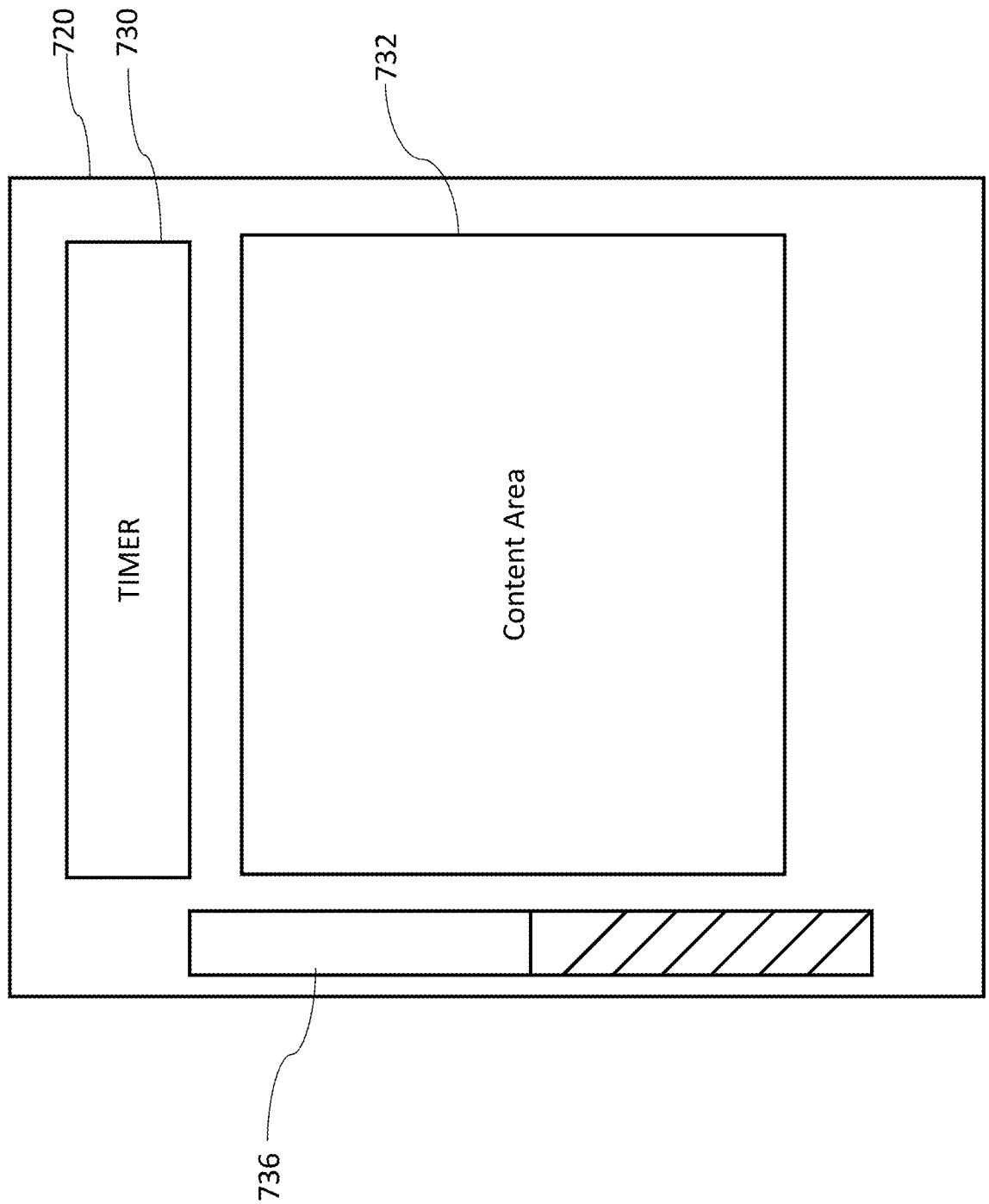
FIG. 7 schematically shows a user interface providing content of some other embodiments.

Reference is made to FIG. 7. In some embodiments, when the interaction area 708 displayed on the user interface is shown in FIG. 5 receives or is associated with user input, this causes the schematic image 720 shown FIG. 7 to be displayed by the user interface. This may be as an alternative to the arrangement of FIG. 6. The image displayed may have three general areas. (There may be one or more other areas in other embodiments.) The first area 730 displays time information. This area may display the remaining time, the time elapsed and/or a visual representation of the time information. In some embodiments, the time information may be in the form of countdown timer information. In other embodiments the time information may be in the form of count up timer information. Alternatively or additionally, in some embodiments, the time information may comprise an indication of the rate at which the timer is updated.

In the example discussed in relation to FIG. 5, the timer area 730 may indicate when the game feature is next available.

The second area 732 is arranged to display content or the like. This may be as described in relation to FIG. 6. A visual indicator 736 may be provided. This visual indicator may indicate one or more of a rate at which the timer is updated, the time remaining and the time elapsed. The visual indicator 736 may provide a visual indicator of the rate at which the clock changes. The visual indicator may have a first appearance when the rate is at the normal rate and a second appearance when the rate is at the second rate. Where there is more than one second rate, these may be displayed in a visually distinct manner. By way of example only, the shading of the visual indicator 736 may show the current rate of change with respect to one or more of a maximum rate of change and a minimum rate of change of the clock or timer.

It should be appreciated that the relative positions for the three areas are by way of example only and any other suitable relative position may be provided. In some embodiments one or more the areas may itself be provided by two or more areas. In some embodiments two or more of the areas may overlap or be combined.

Figure 8:
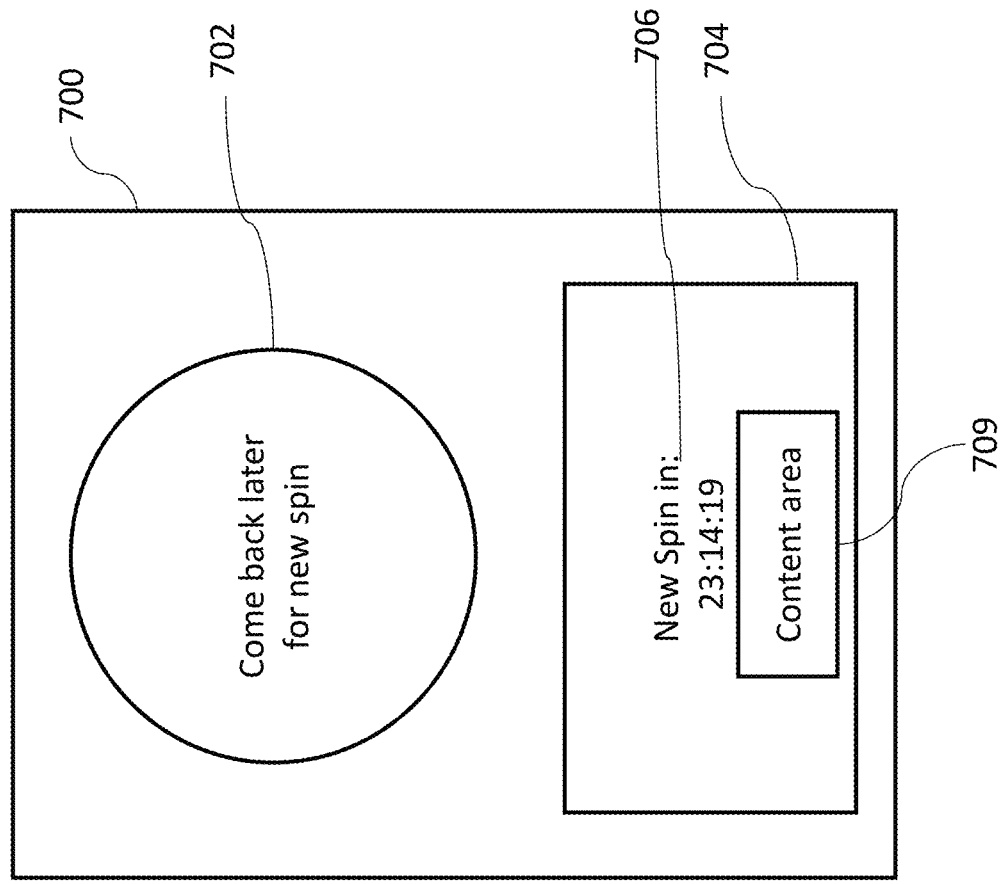
FIG. 8 schematically shows a user interface when a game feature is unavailable for a period of time in other embodiments.

Reference is made to FIG. 8 which shows a modification to the arrangement shown of FIG. 5. In this example, the same reference numerals are used in FIGS. 5 and 8 for corresponding items. In the modification shown in FIG. 8, the fast forward area is replaced by a content area.

When the user wants to change the rate at which the clock changes, the user interface is configured to receive an input which causes content to be provided in the content area. This user interface input may comprise the user selecting the content area. By running the content in the content area, the rate at which the clock changes is altered.

In one modification, the content will run and while the content is running, the rate at which the clock or timer is updated will be at a first rate. If the content is paused or closed then the rate at which the clock or timer is updated will be at a second rate. The second rate may be a slower rate or a faster rate. The second rate may be less favourable as compared to the first rate in terms of the objective associated with the timer.

In another embodiment, if the user interacts with the content area, then the rate at which the clock or timer is updated may be changed to a third rate or rates. The third rate may be more favourable with respect the objective associated with the timer as compared to the timer. The interaction will depend on the nature of the content. For example, the interaction may be to click through to a website or the like.

It should be appreciated that in some embodiments, there may not be a second rate. In other words, an improved rate with respect to the timer objective may only be achieved if the user interacts with the content area.

If the user interacts with the user interface to stop the content, pause the content or close the content area or window, then the rate at which the clock changes may be altered, for example to decrease the rate. This may result in the rate returning to a default rate. In some embodiments, even if the user stops the content, pauses the content or closes the content area or window, the rate at which the clock changes may be maintained at the altered rate at least for a given amount of time.

In one modification, content may automatically be provided in the content area. After the content has been running for a given amount of time or immediately, the rate at which the clock changes is altered, for example to be increased. This will be without requiring any input from the user.

It should be appreciated that the location of the content area with respect to other areas can of course be changed.

Figure 9:
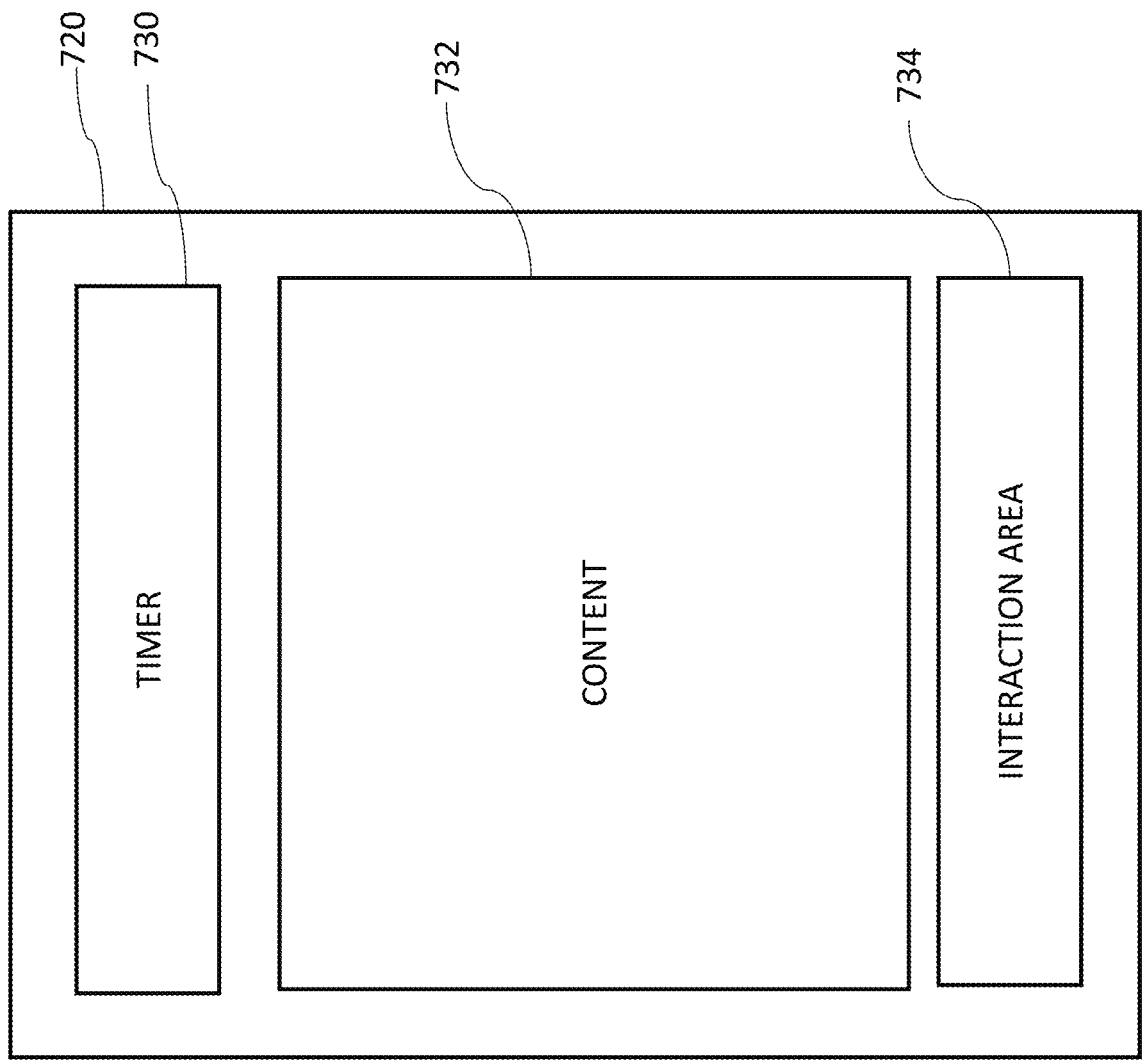
FIG. 9 schematically shows user interface with an interaction area, of some embodiments.

Reference is made to FIG. 9 which shows another embodiment. In this example, the user interface 720 shown in FIG. 9 is provided when the user selects the fast forward option of FIG. 5. In this example, the first timer area 730 displaying information such as described in relation to FIG. 7 is provided. A content area 732 such as described in relation to FIG. 7 is also provided. In this embodiment an interaction area 734 is provided.

In some embodiments, the user is encouraged to interact with the interaction area. This may be one or more of while content is displayed, after content is displayed and before the content is displayed.

For example, when the user interacts with this area, this may cause the content to be displayed. In some embodiments, the user may be encouraged to have further interaction while the content is being played or provided.

In some embodiments, where the user interface is provided by a touch screen, the interaction area 734 is displayed in such a way as to encourage the user to interact with that area.

In some embodiments, the rate at which the clock is updated may be increased and/or decreased in response to different user inputs. The rate may be dependent on the particular user input.

In some embodiments, the period of time may be increased and/or decreased at different rates and/or in response to different user inputs. The rate of change in the period of time may dependent on the particular user inputs.

The interaction of the user with the interaction area may be any suitable interaction. For example the user may be encouraged to tap the interaction area in order to increase the rate at which the remaining time decreases or increases.

The rate at which the user taps the interaction may be used by the at least one processor to determine the rate at which the clock is updated. In some embodiments, the interaction area may be controlled to display an image or series of images which are configured to cause the user to attempt to follow one or more predetermined tapping patterns. The tapping pattern may comprise one or more of tapping timing and tapping position with respect to the display. The rate at which the timer runs may be controlled by the processor in response to determining how closely the user input matches the required pattern.

In some embodiments, the user interaction such as previously described may need to be performed before the user is permitted to view or interact with content.

The user interaction provided by the user may determine one or more aspects associated with the content and the rate at which the clock or timer is updated is dependent on the aspects associated with the content. The user interaction may for example control what content is provided which in turn controls the rate at which the clock or timer is updated.

In an alternative embodiments, the user interaction may be with the user device and may for example be a shaking or other movement. Some user devices are provided with one or more accelerometers and/or other sensors which is/are used to detect types of motion of the user device.

In some embodiments, the interaction area may display instructions to assist the user in understanding the required interactions. For example the interaction area may display the word "faster". This would be in the context of an embodiment, where the user is encouraged to increase the rate at which the user taps the interaction area of the user interface.

In one modification, the user interface of FIG. 5 may be modified to provide an interaction area such as described in relation to FIG. 9. The interaction area may be the same or different to the area 708.

In one modification, the visual indicator such as described in relation to FIG. 7 may be provided in any of the other embodiments. This may be in addition or as an alternative to the timer information.

In some embodiments, the rate at which the timer changes may be controlled by watching or interacting with content.

In some embodiments, if the content is paused or closed, then the rate at which the timer changes may revert to the normal rate.

In some embodiments there may be a limit of the length of time for which the increased rate at which timer changes is applied.

In some embodiments there may be a first normal rate and a second rate, the second rate may be faster than the normal rate or slower than the normal rate depending on the objective with respect to the timer.

In some embodiments, there may be a plurality of different second rates. There be a continuous range of second rates or a set of discrete second rate values.

In some embodiments, a plurality of different game features may be provided. The effect of a given user interaction may be the same for the different game features when the respective game features is unavailable. In other embodiments, the effect of a given user interaction may be different for the different game features when the respective game feature is unavailable. This may be dependent on the usefulness of the game feature when playing the game.

In the previously described embodiments, at least some of the images shown in FIGS. 5 to 9 may be displayed in the environment of the game. For example, where there is a saga map which visualises the different game levels, the images may be displayed with the saga map forming a background.

In some embodiments, there may not be a transition from one user interface to another as described previously in relation to some embodiments. Rather at least some of the features of the different images may be displayed at the same time on the same user interface.

Figure 10:
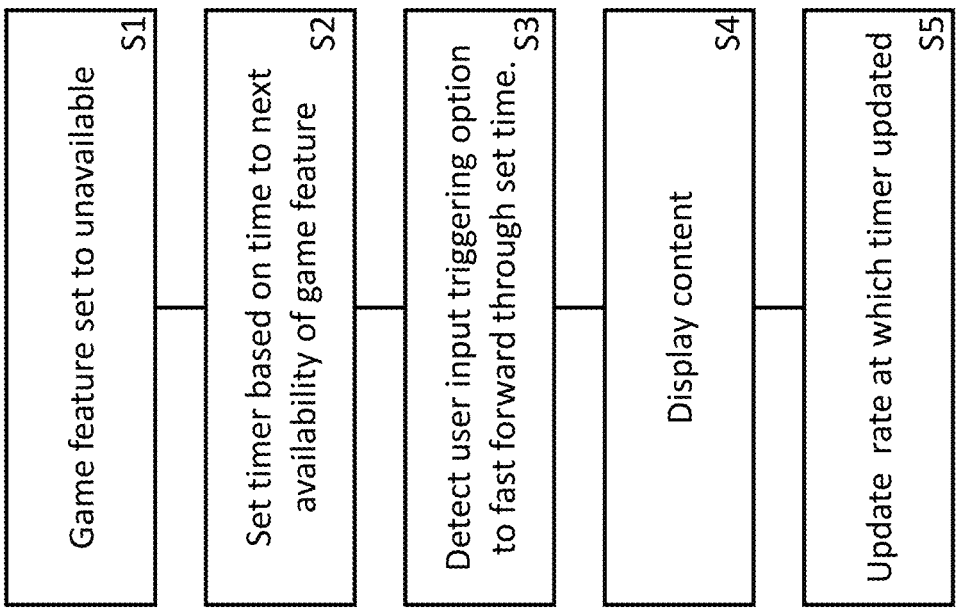
FIG. 10 schematically shows a method of some embodiments.

Reference is made to FIG. 10 which shows a method of some embodiments. By way of example only, the method of FIG. 10 is described in the context of a computer implemented game. However is should be appreciated that the method of FIG. 10 can be used with any other suitable application. In step S1, the at least one processor of the user device determines that a game feature has been set to unavailable for a given period of time.

In step S2, the at least one processor is configured to set a timer or clock based on the time to the next availability of the game feature.

It should be appreciated that steps S1 and S2 may take place generally at the same time, step S1 may take place before step S2 or step S2 may take place before step S1.

In step S3, user input selecting the option to "fast forward" is detected via the user interface. This user input causes an input to be provided to the processor. This input is used by the processor to cause an increase in the rate at which the clock or timer is updated to fast forward through the set time.

Consider the example where the game feature is unavailable for an hour. If the rate at which the clock or timer is updated is increased, the amount of time until the feature is next available will be less than an hour. If the increased rate is twice as fast as an initial rate, the feature would be next available in 30 minutes.

In other embodiments, the rate at which the timer or clock is updated is decreased. In the example where the game feature is unavailable for an hour, if the rate at which the clock or timer is updated is decreased, the amount of time until the feature is next available will be more than an hour. If the decreased rate is half that of the initial rate, the feature would be next available in 2 hours.

This selection may be as a result of a user tapping or selecting an input area displayed on the user interface in the case where the display and user interface are provided by a touch screen.

It should be appreciated that the user input may be at a part of touch screen which invites the user to fast forward, such as shown in FIG. 5. Alternatively or additionally, this may be an interaction with a part of the touch screen which is provided for the content to be displayed. In other embodiments, the input may be an interaction with a part of the touch screen which indicates the unavailability of a feature. In other embodiments, one or more alternative inputs and/or one or more alternative locations on the touch screen may cause the fast forward option to be selected.

In step S4, in response to the detected user input, the processor is configured to cause content to be displayed.

In step S5, the timer is updated. This will be in dependence on the updated rate. In practice, step S5 will take place in parallel with steps S4 at the applicable rate.

It should be appreciated that this method can be modified so as to decrease the rate at which the timer is updated, This method can be modified so that the timer is set and this defines the length of time for which a particular game feature is available.

Figure 11:
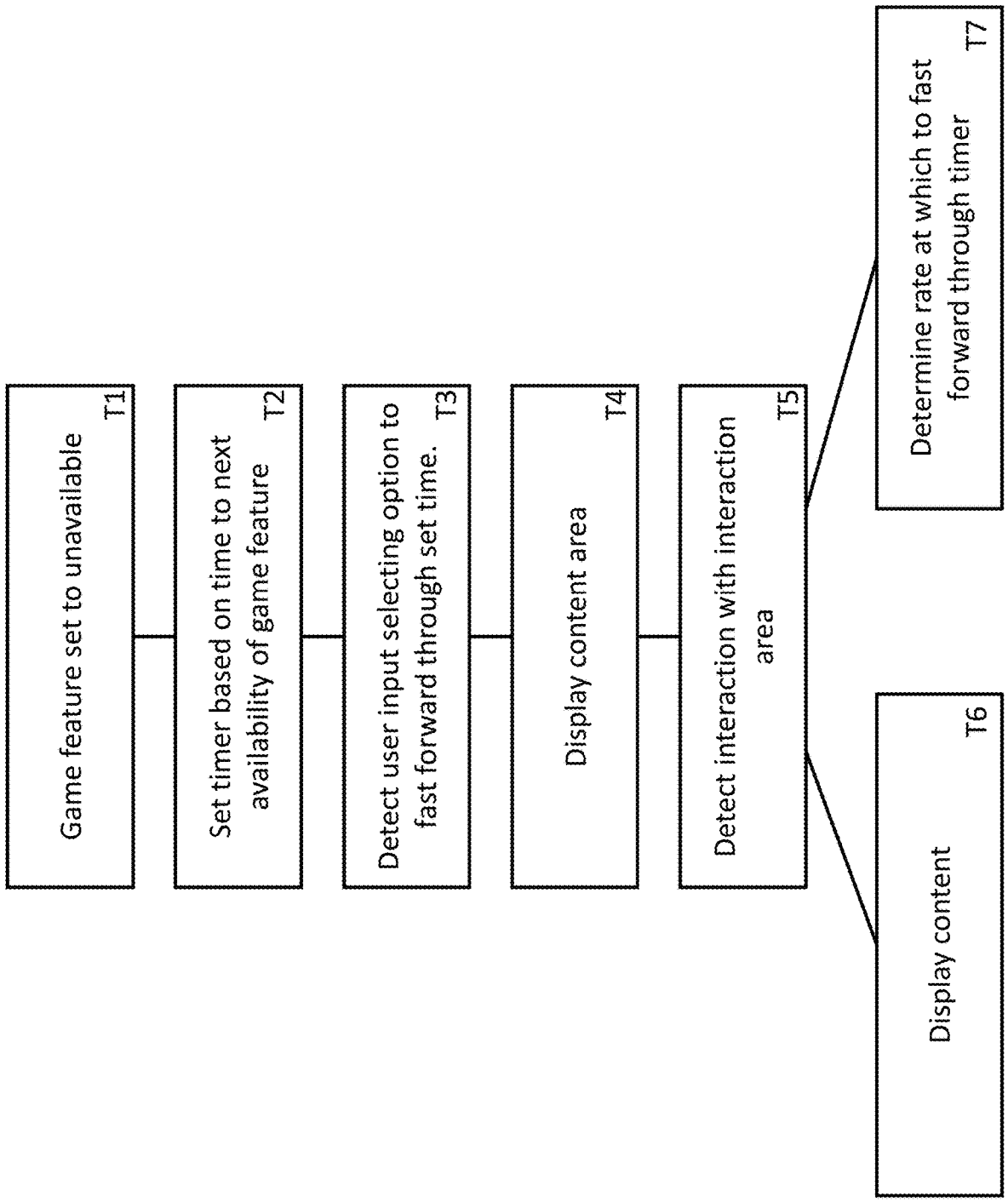
FIG. 11 schematically shows another method of some embodiments.

Reference is made to FIG. 11 which shows another method of some embodiments. By way of example only, the method of FIG. 11 is described in the context of a computer implemented game. However is should be appreciated that the method of FIG. 11 can be used with any other suitable application.

In step T1, the at least one processor of the user device determines that a game feature has been set to unavailable for a given period of time.

In step T2, the at least one processor is configured to set a timer or clock based on the time to the next availability of the game feature.

It should be appreciated that steps T1 and T2 may take place generally at the same time, step T1 may take place before step T2 or step T2 may take place before step T1.

In step T3, user input selecting the option to "fast forward" is detected via the user interface. This user input causes an input to be provided to the processor. This input is used by the processor to cause an increase in the rate at which the clock or timer is updated to fast forward through the set time. This may be as described in relation to step S3 of the method of FIG. 10.

This selection may be as a result of a user tapping or selecting an input area displayed on the user interface in the case where the display and user interface are provided by a touch screen. It should be appreciated that this may be as set out in relation to step S3 of FIG. 10.

In step T4, in response to the detected user input, the processor is configured to cause a content area to be displayed.

In step T5, further user input via the user interface is detected and this provides an input to the at least one processor. In particular, this user input is interaction with a displayed interaction area. This may be the same or different to the content area. In some embodiments, in the absence of the further input, the rate at which the clock or timer is updated may be unchanged and may be at a default rate.

In step T6, content or the like is caused to be displayed on the display by the at least one processor. This may use content provided by the advertisement content provider or any other suitable content. In some embodiments, this step may alternatively be provided in conjunction with step T4. In some embodiments, this step may alternatively be provided between step T4 and step T5.

In step T7, based on the detected further user input, a determination is made as to the rate at which to update the timer or clock. The time which is displayed in controlled in dependence on this determination. This may be to increase or decrease the rate at which the timer is updated. This may be dependent on the detected further input. In some embodiments there may be a plurality of different rates at which the timer or clock can be updated. This may mean that there may be a loop between steps T7 and T5. In some embodiments, there may be a plurality of discrete rates which are selected in dependence on the interaction with the interaction area. This may be as previously described. In some embodiments, the rate at which the clock or timer is updated may be dependent on the detected interaction.

It should be appreciated, that steps T6 and T7, may take place at the same time or any order.

It should be appreciated that these methods may be modified to support one or more of the alternatives described in relation of FIGS. 5 to 9. This may mean the omission of one or more steps and/or the addition of one or more steps.

In the example methods, the aim has been to increase the rate of update of the timer or clock. Of course in other embodiments, the aim may be to decrease the rate of update of the timer or clock.

Some embodiments may provide a static image or animation in the content area. This static image or animation may comprise a tip or hint. This tip or hint may provide information how to make a special move, how to use a particular game element and/or any suitable information. This may be provided automatically or may be in response to user interaction with the user interface.

In some embodiments, the at least one processor may be configured to determine a tip or hint suitable for the user of the device. This may be based on game play by the user. For example if a user has not used a particular game feature or has not used a particular game feature in a particular context or the user has only used the particular game feature less than a threshold number of times. It should be noted that there may be a plurality of different tip options which may be provided and the at least one processor is configured to select a particular option. This may be selected at random, in a given order or may be dependent on one or more other factors. The one or more other factor may be any suitable factor. For example, the tip may be dependent on the player's most recent game play and/or the level being played and/or one or more objectives of the level or game being played.

In some embodiments, one type of content may be super imposed or displayed alongside a different type of content. For example, an advertisement may be super imposed or displayed alongside the static image or animation (or on part thereof) providing the hint or tip.

In some embodiments, the initial displayed static image or animation (or part thereof) may be modified or substituted for an advertisement or other content.

In some embodiments, a lapse of a predefined period of time may be determined.

The lapse of the predefined period of time is determined starting from the initiation of the display of the initial content or after the initial content has been displayed for a given amount of time. In some embodiments, in response to the determination of the lapse of a predetermined amount of time, there may be a triggering of one or more of the following:

The super imposing of an advertisement or other content on the static image or animation (or on part thereof) or other initial content;

The modification or substitution of the static image or animation (or part thereof) or other initial content for an advertisement or other content;

Change a rate at which the clock is updated. This may be to increase the rate or decrease the rate depending on the objective. In some embodiments, this change may be after a given period of time. For example, there may be a speedup from a first level to a second level of speed after first period of time; and Change the rate at which the clock is updated such that the rate changes with time. This may be to increase the rate over time or decrease the rate over time, depending on the objective.

In some embodiments, if the user interacts with the user interface to exit the display of content or to stop the display of content, the rate at which the clock is changed may change to a lower rate. This lower rate may be a default rate.

To illustrate some embodiments, reference has been made to a "wheel" which is unavailable for a given amount of time. Other examples of features which may be unavailable for a given amount of time are:

A next life;
A next level of a game;
A game booster;
A game reward
A game element;
A game character;
A play of a game; and
A type of move.

These features are by way of example only and other embodiments may comprise a different feature.

In the above, the embodiments are provided in the context of a computer implemented game which may be provided as an app or computer program. However, other embodiments may be provided in different contexts such as other apps or computer programs In other embodiments, the user is provided with content. The content may be audio content, video content, text and/or the like. A user may be provided a first part of the content and there may be a time period before the user is able to receive the next part of the content. Embodiments may be provided in this context whereby the time period and/or a timer rate is altered. For example the parts of content may be chapters of books, episodes of a video series, scenes of a movie or the like.

In other embodiments, an app may be provided. The app may be any suitable app. For example the app may be a dating app, a fitness app, a lifestyle app, a social app, a voucher app or any other suitable app. By way of example only, the app may be configured to provide app information and there may be a time period before the user is able to receive the next information. Embodiments may be provided in this context whereby the time period and/or a timer rate is altered. For example, the app information may be a given number of dating profiles, a given number of messages, a given number of recipes or the like.

In other embodiments, there may be a tool in the context of a computer program. The user may be allowed to use the tool. Once the tool has been used a given amount of time or in a given way, there may be a time period before the user is able to use the tool again. By way of example only, the tool may be a paintbrush tool, a highlighting tool or the like. Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device comprising:
a user interface comprising a display configured to display time information associated with a feature, the time information indicating when the feature will change from one of being available and unavailable to the other of being available and unavailable; and
at least one processor configured to control the user interface;
wherein the at least one processor is configured to cause the displayed time information to change at a first rate;
the user interface is configured to receive a user input; and
the at least one processor is configured, in response to the user input received via the user interface to determine content to be displayed on the user interface, the user interface being configured to display the determined content, and the at least one processor further being configured to cause the displayed time information to change at a second different rate while the content is displayed.

2. The computer device as claimed in claim 1, wherein the at least one processor is configured to determined when the content is paused or no longer displayed and in response thereto cause the time information to change at a third rate.

3. The computer device as claimed in claim 2, wherein the third rate is the same as the first rate.

4. The computer device as claimed in claim 1, wherein the content comprises advertising content.

5. The computer device as claimed in claim 1, wherein the feature comprises a computer implemented game feature.

6. The computer device as claimed in claim 1, wherein one of the first rate and the second rate comprise a real time rate.

7. The computer device as claimed in claim 1, wherein the first rate is less than the second rate.

8. The computer device as claimed in claim 1, wherein the at least one processor is configured to provide one of a plurality of second rates in dependence on the user input received via the user interface.

9. The computer device as claimed in claim 8, wherein the user input comprises a plurality of taps.

10. The computer device as claimed in claim 9, wherein a rate of the plurality of taps is configured to control a value of the second rate.

11. The computer device as claimed in claim 1, wherein the at least one processor is configured to control the user interface to display an input area, the user input being with respect to the input area.

12. The computer device as claimed in claim 1, wherein the time information indicates an amount of time until a game feature is the other of being available and unavailable.

13. A computer device as claimed in claim 1, wherein the user interface is provided by a touch screen.

14. A computer device as claimed in claim 1, wherein the user interface is configured to display the determined content in a first area of the display of the user interface and the time information in a second area of the display of the user interface.

15. A computer implemented method for controlling a user interface of a computer device, the computer device comprising the user interface and at least one processor, the user interface comprising a display configured to display time information associated with a feature, the time information indicating when the feature will change from one of being available and unavailable to the other of being available and unavailable, the method comprising:
 causing, by the at least one processor, the display of the user interface to display the time information;
 causing, by the at least one processor, the displayed time information to change at a first rate;
 receiving, by the user interface, a user input;
 determining, by the at least one processor, in response to the user input, content to be displayed on the display of the user interface; and
 displaying on the display of the user interface the determined content, and causing, by the at least one processor, the displayed time information to change at a second different rate while the content is displayed.

16. The computer implemented method as claimed in claim 15, wherein the method comprises determining, by the at least one processor, when the content is paused or no longer displayed and in response thereto causing, by the at least one processor, the time information to change at a third rate.

17. The computer implemented method as claimed in claim 16, wherein the third rate is the same as the first rate.

18. The computer implemented method as claimed in claim 15, wherein the content comprises advertising content.

19. The computer implemented method as claimed in claim 15, wherein the feature comprises a computer implemented game feature.

20. The computer implemented method as claimed in claim 15, wherein one of the first rate and the second rate comprise a real time rate.

21. The computer implemented method as claimed in claim 15, wherein the first rate is less than the second rate.

22. The computer implemented method as claimed in claim 15, wherein the method comprises providing by the at least one processor one of a plurality of second rates in dependence on the user input received via the user interface.

23. The computer implemented method as claimed in claim 22, wherein the user input comprises a plurality of taps.

24. The computer implemented method as claimed in claim 23, wherein a rate of the plurality of taps is configured to control a value of the second rate.

25. A computer readable non-transitory storage medium carrying one or more computer executable instructions which when run on at least one processor of a computer device provide a method to control a user interface of the computer device, the user interface comprising a display configured to display time information associated with a feature, the time information indicating when the feature will change from one of being available and unavailable to the other of being available and unavailable, the method comprising:
 causing by the at least one processor, the display of the user interface to display the time information;
 causing by the at least one processor the displayed time information to change at a first rate;
 receiving by the user interface a user input;
 determining by the at least one processor, in response to the user input, content to be displayed on the user interface; and
 displaying on the display of the user interface the determined content, and
 causing, by the at least one processor, the displayed time information to change at a second different rate while the content is displayed.

* * * * *